US012775119B2

(12) United States Patent
Chen et al.

(10) Patent No.: US 12,775,119 B2
(45) Date of Patent: Oct. 27, 2026

(54) DATA PROCESSING METHOD FOR STATIC COMPUTED TOMOGRAPHY SCANNING AND DEVICE

(71) Applicants: Nuctech Company Limited, Beijing (CN); Tsinghua University, Beijing (CN)

(72) Inventors: Zhiqiang Chen, Beijing (CN); Li Zhang, Beijing (CN); Yuanjing Li, Beijing (CN); Qingping Huang, Beijing (CN); Bo Feng, Beijing (CN); Xianguo Zheng, Beijing (CN); Zhenhua Zhao, Beijing (CN); Pengfei Xing, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 39 days.

(21) Appl. No.: 18/970,299

(22) Filed: Dec. 5, 2024

(65) Prior Publication Data

US 2025/0180764 A1 Jun. 5, 2025

(30) Foreign Application Priority Data

Dec. 5, 2023 (CN) ........................ 202311656909.8

(51) Int. Cl.
*G01V 5/226* (2024.01)

(52) U.S. Cl.
CPC .................................. *G01V 5/226* (2024.01)

(58) Field of Classification Search
CPC ..................................................... G01V 5/226
See application file for complete search history.

(56) References Cited

U.S. PATENT DOCUMENTS 5,454,019 A * 9/1995 Migita .................. A61B 6/032 378/15
6,236,709 B1 5/2001 Perry et al.
(Continued)

FOREIGN PATENT DOCUMENTS

CN 105759318 7/2016
CN 108042110 A 5/2018
(Continued)

OTHER PUBLICATIONS

"European Application No. 24217859.8, Extended Search Report dated Mar. 31, 2025", (Mar. 31, 2025), 3 pgs.
(Continued)

*Primary Examiner* — Chih-Cheng Kao
(74) *Attorney, Agent, or Firm* — Schwegman Lundberg & Woessner, P.A.

(57) ABSTRACT

A data processing method for static computed tomography scanning and a device are provided. The data processing method for static CT scanning includes: performing, in response to receiving a beam synchronization pulse signal, a time synchronization on N angle pulse signals and a time synchronization on N belt pulse signals by using the beam synchronization pulse signal, to obtain N synchronization angle pulse signals and N synchronization belt pulse signals, respectively; generating N timestamps based on the N synchronization angle pulse signals and the N synchronization belt pulse signals, where the N timestamps correspond to N scanning imaging systems of a static CT scanning device, respectively, and each of the N timestamps includes angle data and belt data; and packaging beam data, detection data, the angle data, and the belt data corresponding to each of the N scanning imaging systems to obtain N data packets.

15 Claims, 6 Drawing Sheets

(56) References Cited

U.S. PATENT DOCUMENTS

| | | | |
|---|---|---|---|
| 6,381,299 | B1 | 4/2002 | Baba et al. |
| 2008/0087833 | A1 | 4/2008 | Mccroskey et al. |
| 2010/0277312 | A1* | 11/2010 | Edic ........................ G01V 5/222 378/57 |
| 2011/0206179 | A1* | 8/2011 | Bendahan ................ G01V 5/22 378/19 |
| 2017/0122884 | A1* | 5/2017 | Zhang .................... G01N 23/04 |
| 2017/0164910 | A1 | 6/2017 | Cao et al. |

FOREIGN PATENT DOCUMENTS

| | | | |
|---|---|---|---|
| CN | 109961489 | A | 7/2019 |
| CN | 111982939 | A | 11/2020 |
| CN | 113995431 | A | 2/2022 |
| JP | 6073443 | | 4/1985 |
| JP | 2004288149 | | 10/2004 |
| JP | 2011226004 | | 11/2011 |
| JP | 2017501414 | | 1/2017 |
| JP | 2017142217 | | 8/2017 |
| WO | 2019130373 | | 7/2019 |
| WO | 2020139306 | | 7/2020 |

OTHER PUBLICATIONS

“Chinese Application No. 202311656909.8, Chinese Search Report dated Oct. 26, 2024”, (Oct. 26, 2024), 9 pgs.

Li, Xinbin, et al., “CT Intelligent Solution for Real-time Inspection and Release of Baggage and Cargo”, CT Theory and Applications, 2022, 31(5):597-615 // DOI:10.15953/j.ctta.2022.124 (http://dx.doi.org/10.15953/j.ctta.2022.124), (2022), 597-615.

“Japanese Application No. 2024-211635, Office Action dated Oct. 24, 2025”, w English Translation, Oct. 24, 2025, 4 pgs.

“Korean Application Serial No. 10-2024-0179643, Office Action dated Aug. 26, 2026”, W machine English translation, 11 pgs.

* cited by examiner

300a

DATA PROCESSING METHOD FOR STATIC COMPUTED TOMOGRAPHY SCANNING AND DEVICE

This application claims the benefit of priority to Chinese Patent Application No. 202311656909.8, filed on Dec. 5, 2023. The entire contents of this application are hereby incorporated herein by reference.

TECHNICAL FIELD

The present disclosure relates to a field of radiation detection technology, and in particular, to a data processing method for static computed tomography scanning and a static computed tomography scanning device.

BACKGROUND

The static CT (Computed Tomography) scanning device is widely used in medical, security inspection, and industrial fields. The static CT scanning device sequentially emits scanning rays by using a plurality of ray sources so as to achieve the effect of rotating scanning the object to be scanned. To achieve 360° scanning coverage of the object to be scanned, the static CT scanning device is usually provided with a plurality of scanning imaging systems distributed in a scanning channel direction of the static CT scanning device. The ray sources of the plurality of scanning imaging systems may provide scanning with different angles for the object to be scanned.

Usually, the scanning processes of the plurality of scanning imaging systems are independent from each other. Therefore, the degree of time synchronization between the plurality of scanning imaging systems is an important factor affecting the accuracy of scanning data.

SUMMARY

The present disclosure provides a data processing method for static computed tomography scanning and a static computed tomography scanning device.

According to an aspect of the present disclosure, a data processing method for static CT scanning is provided, including: performing, in response to receiving a beam synchronization pulse signal, a time synchronization on N angle pulse signals and a time synchronization on N belt pulse signals by using the beam synchronization pulse signal, so as to obtain N synchronization angle pulse signals and N synchronization belt pulse signals, respectively, where N is an integer greater than 1; generating N timestamps based on the N synchronization angle pulse signals and the N synchronization belt pulse signals, where the N timestamps correspond to N scanning imaging systems of a static CT scanning device, respectively, and each of the N timestamps includes angle data and belt data; and packaging beam data, detection data, the angle data, and the belt data corresponding to each of the N scanning imaging systems to obtain N data packets.

According to embodiments of the present disclosure, each of the N data packets includes the beam data, the angle data, the belt data, and the detection data.

According to embodiments of the present disclosure, the angle data includes first angle data and second angle data, the first angle data includes a scanning angle of a corresponding scanning imaging system, and the second angle data includes a scanning count of the scanning imaging system.

According to embodiments of the present disclosure, the belt data includes first belt data and second belt data, the first belt data includes a pulse count value of the synchronization belt pulse signal, and the second belt data includes a reset information of the first belt data.

According to embodiments of the present disclosure, the data processing method for static CT scanning further includes: parsing the N data packets to obtain N beam data, N detection data, N belt data, and N angle data; and performing a data rearrangement on the N detection data based on the N beam data corresponding to the N detection data, the N belt data corresponding to the N detection data, and the N angle data corresponding to the N detection data, so as to obtain N slice data.

According to embodiments of the present disclosure, each of the N slice data includes a detector information, the angle data, and detector data, the detector information includes a plurality of detector numbers, the angle data includes M scanning angles, the detector data includes $M \times K$ detector pixel values, and each of M and K is an integer greater than 1; and each of the N slice data indicates the $M \times K$ detector pixel values detected by detectors corresponding to each of the plurality of detector numbers at the M scanning angles.

According to embodiments of the present disclosure, the beam synchronization pulse signal is a differential signal; the angle pulse signal includes a first angle pulse signal and a second angle pulse signal, each of the first angle pulse signal and the second angle pulse signal is a differential signal, the first angle pulse signal indicates a scanning angle of the scanning imaging system, and the second angle pulse signal is a reset signal for the scanning angle; and the belt pulse signal includes a first belt pulse signal and a second belt pulse signal, each of the first belt pulse signal and the second belt pulse signal is a differential signal, the first belt pulse signal indicates a belt displacement information, and the second belt pulse signal is a reset signal for the belt displacement information.

According to another aspect of the present disclosure, a static CT scanning device is provided, including: N scanning imaging systems, where N is an integer greater than 1; each of the N scanning imaging systems includes: an optical-mechanical system configured to emit a scanning ray; a detector configured to receive the scanning ray transmitted through an object to be scanned and generate detection data based on the received scanning ray; and an acquisition controller configured to: perform, in response to receiving a beam synchronization pulse signal, a time synchronization on angle pulse signals and a time synchronization on belt pulse signals by using the beam synchronization pulse signal, so as to obtain synchronization angle pulse signals and synchronization belt pulse signals, respectively; generate timestamps based on the synchronization angle pulse signals and the synchronization belt pulse signals, where the timestamp includes angle data and belt data; and package beam data, detection data, the angle data, and the belt data of the scanning imaging system to obtain a data packet.

BRIEF DESCRIPTION OF THE DRAWINGS

The above and other objectives, features, and advantages of embodiments of the present disclosure will be more clearly described by combining the accompanying drawings below. It should be noted that throughout the accompanying drawings, the same elements are represented by the same or similar reference numerals. In the accompanying drawings.

DETAILED DESCRIPTION OF EMBODIMENTS

Figure 1A:
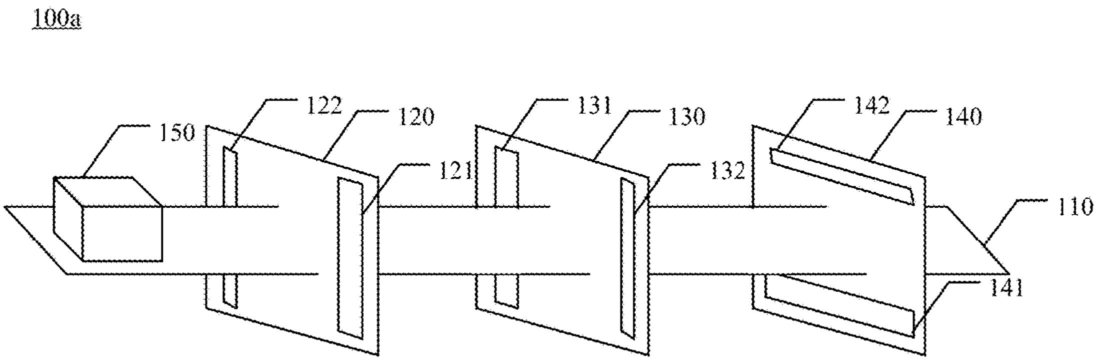
FIG. 1A shows a schematic structural diagram of a static CT scanning device according to an embodiment of the present disclosure.

In order to clarify the purpose, technical solution, and advantages of embodiments of the present disclosure, a clear and complete description of the technical solution in embodiments of the present disclosure will be provided below in conjunction with the accompanying drawings. Clearly, the described embodiments are a part of embodiments of the present disclosure, not all embodiments. Based on the described embodiments of the present disclosure, all other embodiments obtained by those ordinary skilled in the art without the need for creative labor are within the scope of protection of the present disclosure. In the following description, some specific embodiments are for illustrative purposes only and should not be construed as limiting the present disclosure in any way, but rather as examples of embodiments of the present disclosure. Conventional structures or constructions will be omitted where the present disclosure may cause confusion in understanding. It should be noted that the shapes and dimensions of various components in the figures do not reflect the actual size and proportion, but only illustrate the content of embodiments of the present disclosure.

Unless otherwise defined, the technical or scientific terms used in embodiments of the present disclosure should have the usual meanings understood by those skilled in the art. The terms "first", "second", and similar words used in embodiments of the present disclosure do not indicate any order, quantity, or importance, but are only used to distinguish different components.

In addition, in the description of embodiments of the present disclosure, the term "connected to" or "connected" may refer to two components directly connected, or to two components connected via one or more other components, with the connection method being electrical connection or electrical coupling.

In the following, various embodiments according to the present disclosure will be described in detail with reference to the accompanying drawings. It should be noted that in the accompanying drawings, the same reference numerals are assigned to components that have substantially the same or similar structures and functions, and repeated descriptions about them will be omitted.

FIG. 1A shows a schematic structural diagram of a static CT scanning device according to an embodiment of the present disclosure.

As shown in FIG. 1A, a static CT scanning device 100A includes a conveying belt 110 and a plurality of scanning imaging systems. Each scanning imaging system includes a detector array and a multi-target array optical machine. The multi-target array optical machine serves as a ray source for emitting a scanning ray. The detector array receives the scanning ray transmitted through the object to be scanned 150 and generates detection data based on the received scanning ray. The detector array and the corresponding multi-target array optical machine included in each of the plurality of scanning imaging systems form a scanning beam.

For example, a detector array 121 and a corresponding multi-target array optical machine 122 form a scanning beam 120; a detector array 131 and a corresponding multi-target array optical machine 132 form a scanning beam 130; and a detector array 141 and a corresponding multi-target array optical machine 142 form a scanning beam 140.

As shown in FIG. 1A, the scanning beam 120, the scanning beam 130, and the scanning beam 140 are distributed at different positions of the conveying belt 110 in a conveying direction of the conveying belt 110. The conveying direction of the conveying belt 110 may be a direction from the scanning beam 120 to the scanning beam 140, and the object to be scanned 150 on the conveying belt 110 is sequentially conveyed to the scanning beam 120, the scanning beam 130, and the scanning beam 140. It should be noted that the number of objects to be scanned 150 shown in FIG. 1A is only an exemplary illustration. In practical use scenarios, a plurality of objects to be scanned may be placed on the conveying belt 110 at the same time, and the plurality of objects to be scanned are located at different positions on the conveying belt 110.

In embodiments of the present disclosure, the ray paths of the multi-target array optical machines for the scanning beam 120, the scanning beam 130, and the scanning beam 140 are different, so as to provide scanning with different angles for the object to be scanned 150. Each of the scanning beams 120, 130, and 140 may be perpendicular or inclined to the conveying direction of the conveying belt 110. It should be noted that the number of scanning beams shown in FIG. 1A is only an exemplary illustration, and the corresponding number of scanning beams may be provided according to actual desires. The present disclosure does not limit the number of scanning beams.

For example, in a case that the static CT scanning device provides three scanning beams, each scanning beam may provide a 120° scanning for the object to be scanned 150, and the 120θ scanning angles provided by the three scanning beams do not overlap with each other, thereby achieving a 360θ scanning of the object to be scanned 150. For example, the detector array 121 and the corresponding multi-target array optical machine 122 may provide a 120° scanning for the object to be scanned 150. The multi-target array optical machine 122 includes a plurality of target optical machines, which may sequentially emit scanning rays one by one to achieve scanning of the object to be scanned 150. For example, the multi-target array optical machine 122 may include forty target optical machines, each of the forty target optical machines is equivalent to providing a 3° scanning for the object to be scanned 150.

In embodiments of the present disclosure, the object to be scanned 150 is placed on the conveying belt 110 and is stationary relative to the conveying belt 110. The object to be scanned 150 passes through the scanning beam 120, the scanning beam 130, and the scanning beam 140 along the conveying belt 110 and the scanning of the object to be scanned 150 is completed. The detection data obtained by scanning based on the scanning beam 120, the scanning beam 130, and the scanning beam 140 is acquired and processed to obtain a complete three-dimensional reconstruction image of the object to be scanned 150.

The plurality of scanning imaging systems included in the static CT scanning device 100A are separate imaging systems. The plurality of scanning imaging systems may use their respective data acquisition modules to acquire detection data. Even if the operating processes of the plurality of scanning imaging systems may be controlled by the same signal, the moments of starting detection data acquisition may not be synchronized. For example, after the plurality of scanning imaging systems receive the start signal simultaneously, one of the scanning imaging systems may experience delayed start due to faults or other factors, resulting in the problem that time synchronization is not achieved between the detection data acquired by the plurality of scanning imaging systems.

For example, the detector array 121 and the multi-target array optical machine 122 located within the scanning beam 120, as well as the detector array 131 and the multi-target array optical machine 132 located within the scanning beam 130, start and scan at the same time. However, the detector array 141 and the multi-target array optical machine 142 located within the scanning beam 140 are delayed in starting due to fault factors. This means that when the multi-target array optical machine 122 and the multi-target array optical machine 132 perform the second circle of scanning on the object to be scanned, the multi-target array optical machine 142 only starts the first circle of scanning on the object to be scanned.

For example, in a normal scanning process, the first circle of scanning corresponds to the first section of the object to be scanned, and the second circle of scanning corresponds to the second section of the object to be scanned. Scanning a complete circle of each section of the object to be scanned may obtain the complete slice data corresponding to that section of the object to be scanned. The plurality of slice data may form the scanning data of the object to be scanned, such as the three-dimensional reconstruction image of the object to be scanned.

However, due to the startup delay of the multi-target array optical machine 142, the multi-target array optical machine 142 may have missed the scanning of the first section and may mistake the scanning of the second section for the scanning of the first section.

It should be noted that, the multi-target array optical machine 122, the multi-target array optical machine 132, and the multi-target array optical machine 142 may scan the same object to be scanned or different objects to be scanned at the same time.

For example, the multi-target array optical machine 122, the multi-target array optical machine 132, and the multi-target array optical machine 142 may provide scanning of 10° to 120°, 121° to 240°, and 241° to 360° for the object to be scanned, respectively. As the multi-target array optical machine 122, the multi-target array optical machine 132, and the multi-target array optical machine 142 are not synchronized, the final detection data acquired by the static CT scanning device may not synchronized. For example, the detection data for the first section 1° to 120° of the object to be scanned 150 and the detection data for the second section 241° to 360° of the object to be scanned 150 may form one slice data, resulting in scanning data errors.

Figure 1B:
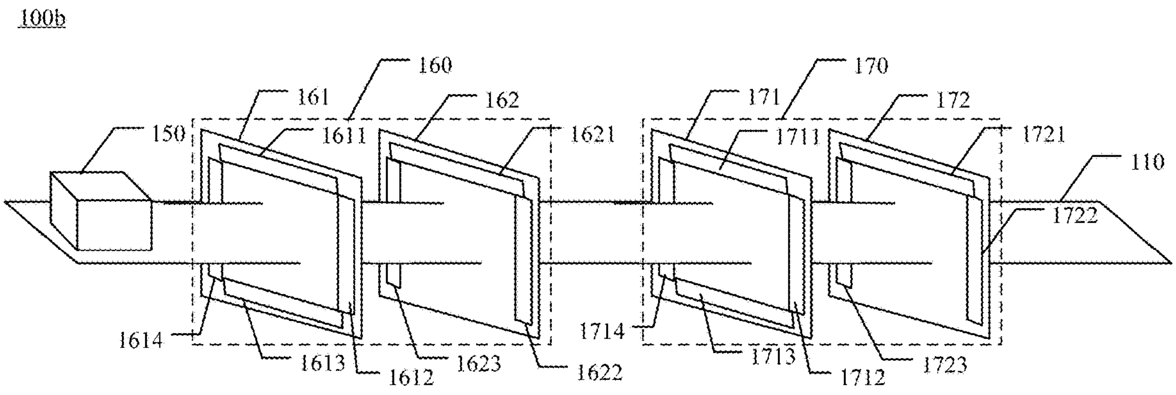
FIG. 1B shows a schematic structural diagram of a static CT scanning device according to another embodiment of the present disclosure.

FIG. 1B shows a schematic structural diagram of a static CT scanning device according to another embodiment of the present disclosure.

As shown in FIG. 1B, a static CT scanning device 100*b* includes a conveying belt 110 and a plurality of scanning imaging systems 160 and 170. Each scanning imaging system includes a plurality of detector arrays and a plurality of multi-target array optical machines. For example, in the scanning imaging system 160, the plurality of detector arrays 1611, 1612, 1613 and 1614 share a physical plane, forming a ring detector surface 161; and the plurality of multi-target array optical machines 1621, 1622 and 1623 share a physical plane, forming an optical machine surface 162. In the scanning imaging system 170, the plurality of detector arrays 1711, 1712, 1713 and 1714 share a physical plane, forming a ring detector surface 171; and the plurality of multi-target array optical machines 1721, 1722 and 1723 share a physical plane, forming an optical machine surface 172.

In each scanning imaging system, the plurality of multi-target array optical machines form a ring optical path. Each multi-target array optical machine is deflected by a certain angle, and all optical machines are directed towards the corresponding ring detector surface. Each multi-target array optical machine emits scanning rays to form a scanning beam. The scanning ray emitted by each multi-target array optical machine is a conical beam, and the detector array covered by the conical beam acquires the scanning ray transmitted through the object to be scanned 150. The detector array generates the detection data based on the received scanning rays.

For example, each multi-target array optical machine includes a plurality of targets, which sequentially emit scanning rays. For example, in the scanning imaging system 160, after the first target of the multi-target array optical machine 1621 emits a scanning ray, the first target of the multi-target array optical machine 1622 emits a scanning ray, then the first target of the multi-target array optical machine 1623 emits a scanning ray, and then the respective second targets of the multi-target array optical machines 1621, 1622, and 1623 emit scanning rays in sequence, thereby achieving the scanning of the object to be scanned 150 passing through the scanning imaging system 160.

The number of objects to be scanned 150 shown in FIG. 1B is only an exemplary illustration. In practical use scenarios, a plurality of objects to be scanned may be placed on the conveying belt 110 at the same time, and the plurality of objects to be scanned are located at different positions on the conveying belt 110. The number of scanning imaging systems shown in FIG. 1B is for illustrative purposes only, and the corresponding number of scanning imaging systems may be provided according to actual desires. The present disclosure does not limit the number of scanning imaging systems.

Similar to the static CT scanning device 100*a* shown in FIG. 1A, the plurality of scanning imaging systems included in the static CT scanning device 100*b* are also separated from each other. Each scanning imaging system uses its own data acquisition module to acquire detection data, and there may be a problem that the moments of starting detection data acquisition are not synchronized.

Based on the above, the present disclosure provides a data processing method for static computed tomography scanning, including: performing, in response to receiving a beam synchronization pulse signal, a time synchronization on N angle pulse signals and a time synchronization on N belt pulse signals by using the beam synchronization pulse signal, so as to obtain N synchronization angle pulse signals and N synchronization belt pulse signals, respectively, where N is an integer greater than 1; generating N timestamps based on the N synchronization angle pulse signals and the N synchronization belt pulse signals, where the N timestamps correspond to N scanning imaging systems of a static CT scanning device, respectively, and each of the N timestamps includes angle data and belt data; and packaging beam data, detection data, the angle data, and the belt data corresponding to each of the N scanning imaging systems to obtain N data packets.

Figure 2:
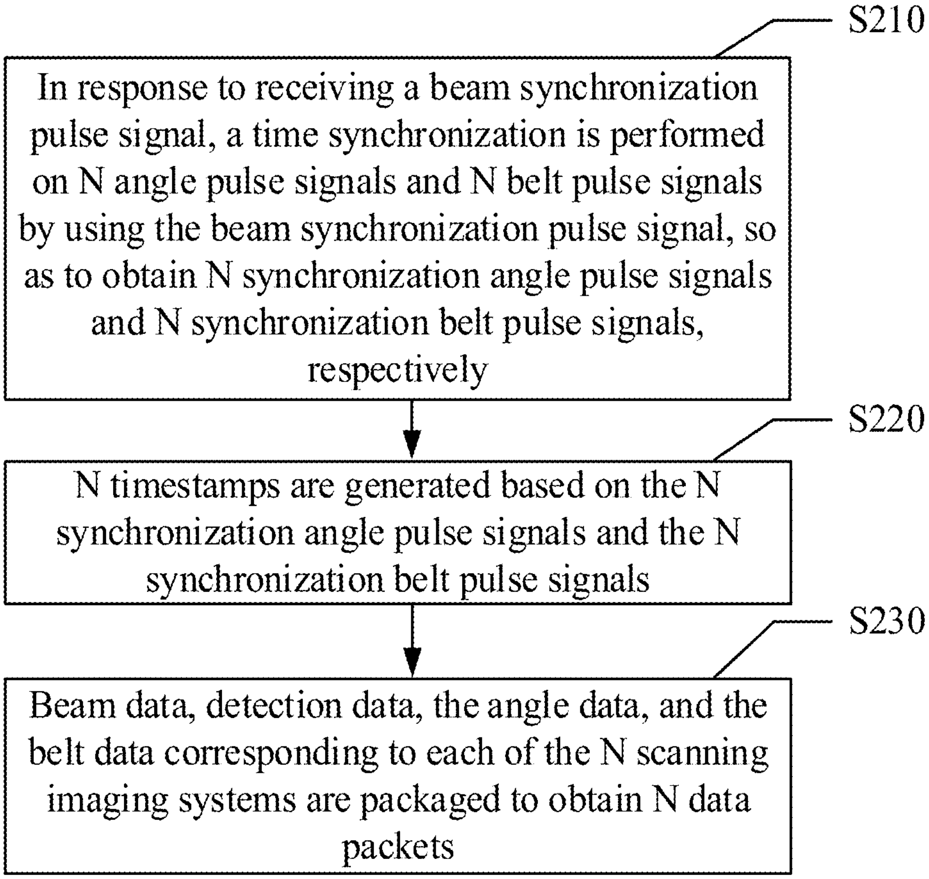
FIG. 2 shows a flowchart of a data processing method for static CT scanning according to an embodiment of the present disclosure.

FIG. 2 shows a flowchart of a data processing method for static CT scanning according to an embodiment of the present disclosure.

As shown in FIG. 2, the data processing method for static CT scanning in this embodiment may include operations S210 to S230.

In operation S210, in response to receiving a beam synchronization pulse signal, a time synchronization is performed on N angle pulse signals and N belt pulse signals by using the beam synchronization pulse signal, so as to obtain N synchronization angle pulse signals and N synchronization belt pulse signals respectively, where N is an integer greater than 1.

In embodiments of the present disclosure, N angle pulse signals and N belt pulse signals are the angle pulse signals and belt pulse signals received by the N scanning imaging systems of the static CT scanning device. For example, one angle pulse signal and one belt pulse signal may be sent to each of the N scanning imaging systems. Therefore, the N angle pulse signals respectively received by the N scanning imaging systems are the same, and the N belt pulse signals respectively received by the N scanning imaging systems are also the same.

In embodiments of the present disclosure, each of the N scanning imaging systems may scan the object to be scanned passing through the scanning region of that scanning imaging system based on the received angle pulse signal and belt pulse signal. For each scanning imaging system, the number of scanning circles and the scanning angles of the scanning imaging system for the object to be scanned may be determined based on the angle pulse signal. The location of the object to be scanned in the transmission belt may be determined based on the belt pulse signal.

For example, based on the first pulse of the received angle pulse signal, it is possible to determine that the scanning imaging system is performing the first circle of scanning on the object to be scanned. Based on the first pulse of the received belt pulse signal, the scanning imaging system may determine that the object to be scanned has moved forward a fixed distance.

In embodiments of the present disclosure, the beam synchronization pulse signal may be the reset signal for the angle pulse signals and the belt pulse signals received by all the scanning imaging systems. Based on the beam synchronization pulse signal, the angle pulse signals and the belt pulse signals received by all the scanning imaging systems have the same time reference.

For example, in the normal operation, the plurality of scanning imaging systems are simultaneously started to receive the same angle pulse signal and the same belt pulse signal simultaneously. As the object to be scanned moves on the conveying belt, the object to be scanned sequentially passes through the first scanning imaging system and the second scanning imaging system. According to the conveying speed of the belt and the scanning speed of the multi-target array optical machine, the first scanning imaging system scans the object to be scanned for the first circle based on the first pulse of the angle pulse signal and the first pulse of the belt pulse signal, so as to obtain the first section 0°-180° data of the object to be scanned as the first detection data. The second scanning imaging system scans the object to be scanned for the first circle based on the $17^{th}$ pulse of the angle pulse signal and the $17^{th}$ pulse of the belt pulse signal, so as to obtain the first section 181°-360° data of the object to be scanned as the second detection data. The first detection data and the second detection data may form slice data of the first section of the object to be scanned.

However, due to the possible inconsistency in the start-up timing of the plurality of scanning imaging systems, or the inconsistency in the data acquisition timing of the plurality of scanning imaging systems, the processes of scanning the object to be scanned by the plurality of scanning imaging systems based on the angle pulse signal and the belt pulse signal may not be synchronized at the same time. For example, if the startup of the second scanning imaging system is delayed, it may cause the second scanning imaging system to scan the second section of the object to be scanned based on the $17^{th}$ pulse of the angle pulse signal and the $17^{th}$ pulse of the belt pulse signal, so as to obtain 181°-360° data (third detection data) of the second section of the object to be scanned. The static CT scanning system may mistakenly use the third detection data as the second detection data, which forms the slice data of the first section of the object to be scanned with the first detection data, resulting in slice data errors.

In embodiments of the present disclosure, all angle pulse signals and belt pulse signals are reset based on the beam synchronization pulse signal, so as to obtain synchronization angle pulse signals and synchronization belt pulse signals. Based on the synchronization angle pulse signals and the synchronization belt pulse signals, the plurality of scanning imaging systems may re-determine the detection data with a unified time reference.

For example, in the case where the scanning processes are not synchronized as described above, when the second scanning imaging system is successfully started and receives the first pulse of the angle pulse signal and the first pulse of the belt pulse signal, the first scanning imaging system has already received the second pulse of the angle pulse signal and the second pulse of the belt pulse signal. After resetting based on the beam synchronization pulse signal, the first scanning imaging system and the second scanning imaging system may determine the next pulse received after reset as the first pulse. Therefore, the first scanning imaging system and the second scanning imaging system may re-acquire the detection data based on the first pulse of the synchronization angle pulse signal and the first pulse of the synchronization belt pulse signal.

For example, after resetting based on the beam synchronization pulse signal, the first scanning imaging system may determine the received third pulse as the first pulse, and the second scanning imaging system may determine the received second pulse as the first pulse.

In operation S220, N timestamps are generated based on the N synchronization angle pulse signals and the N synchronization belt pulse signals.

In embodiments of the present disclosure, the N timestamps correspond to N scanning imaging systems of the static CT scanning device, respectively, and each of the N timestamps includes angle data and belt data.

For example, each of the plurality of scanning imaging systems may count the received pulses of the synchronization angle pulse signal and the received pulses of the synchronization belt pulse signal. For example, the scanning imaging system counts the number of received pulses of the synchronization angle pulse signal, so as to obtain the angle data. The scanning imaging system counts the number of received pulses of the synchronization belt pulse signal, so as to obtain the belt data.

In operation S230, beam data, detection data, the angle data, and the belt data corresponding to each of the N scanning imaging systems are packaged to obtain N data packets.

In embodiments of the present disclosure, the beam data may represent the beam number of the scanning imaging system. The distribution location of the corresponding scanning imaging system on the conveying belt may be determined through the beam number. For example, when determining the beam number as 1, the corresponding scanning imaging system may be determined as the first scanning imaging system through which the object to be scanned passes.

In embodiments of the present disclosure, the detection data is generated by the following processes: the detector array in the scanning imaging system receives the scanning ray transmitted through the object to be scanned, and then the detection data is generated based on the received scanning ray. The image of the object to be scanned may be determined through the detection data.

In embodiments of the present disclosure, the data packet includes but is not limited to the Ethernet data packet. Each data packet may include the beam data, the angle data, the belt data, and the detection data for each scanning imaging system. The detection data is associated with the beam data, the angle data, and the belt data, so that the detection data have the hardware timestamp. The hardware timestamp refers to the data obtained based on the operating processes of the belt pulley and the multi-target array optical machine. Due to the consistent impact of the operating ability of the belt pulley on the plurality of scanning imaging systems in the static CT scanning, the consistent impact of the operating ability of the multi-target array machine on each circle of scanning process of the same scanning imaging system, and the use of the same multi-target array optical machine in the plurality of scanning imaging systems, the operating ability of the multi-target array optical machine has a consistent impact on the plurality of scanning imaging systems.

As the angle data and the belt data of the plurality of scanning imaging systems are obtained based on pulse signals with the same reference, the hardware timestamps of the detection data of the plurality of scanning imaging systems have the same time reference, thereby achieving high time synchronization between the detection data of the plurality of scanning imaging systems.

In embodiments of the present disclosure, when rearranging the data in the data packet to form slice data, the detection data in the plurality of data packets may be rearranged based on the hardware timestamp of each data packet, so that there is an accurate correspondence between the plurality of detection data, thereby obtaining accurate slice data.

According to embodiments of the present disclosure, the time synchronization is performed on the angle pulse signals and the belt pulse signals of the plurality of scanning imaging systems by using the beam synchronization pulse signal, so that the plurality of scanning imaging systems may generate respective timestamps based on the synchronized angle pulse signals and the synchronized belt pulse signals received. The plurality of scanning imaging systems may identify respective detection data based on respective timestamps, ensuring time synchronization between detection data of the plurality of scanning imaging systems, thereby ensuring that the static CT scanning device acquires accurate scanning data through the plurality of scanning imaging systems and ensuring stable and reliable operation of the static CT scanning device.

Figure 3A:
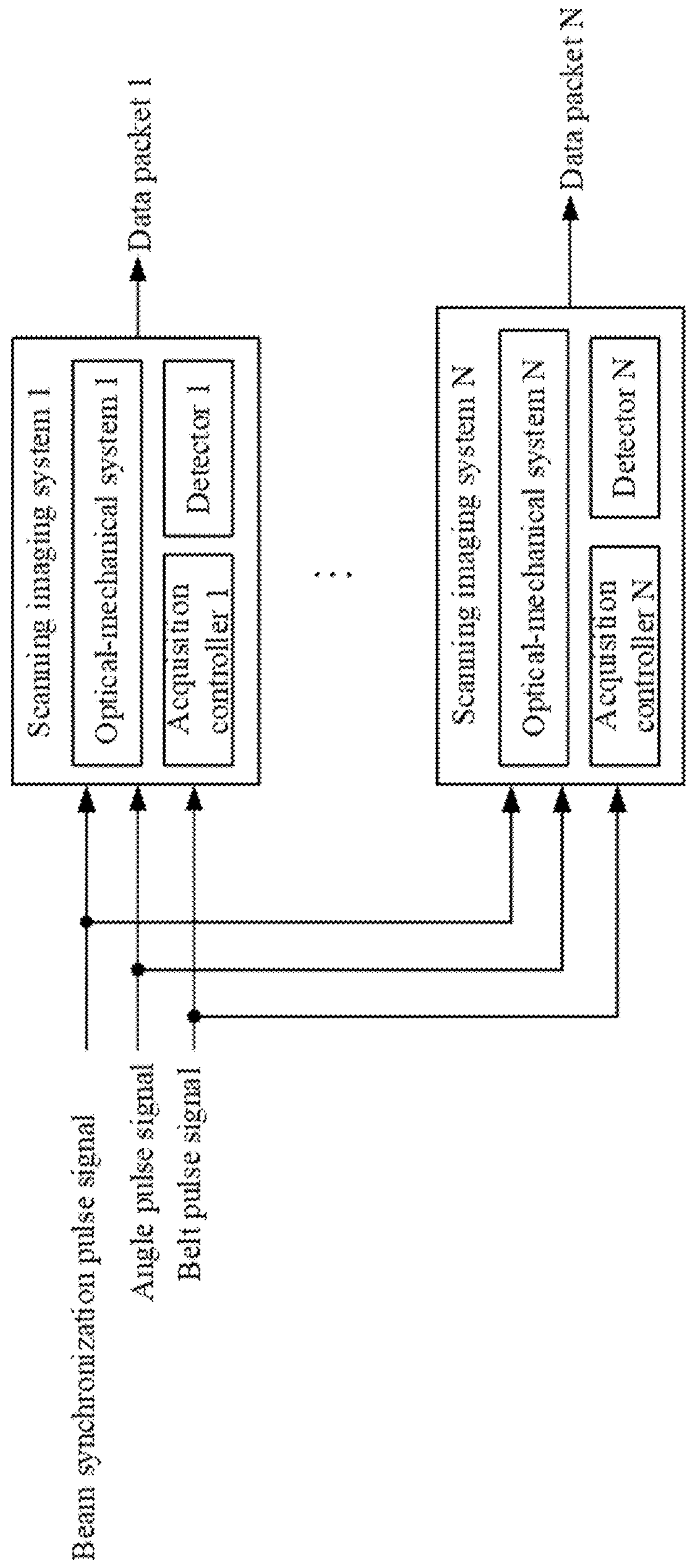
FIG. 3A shows a schematic structural diagram of a static CT scanning device according to another embodiment of the present disclosure.
Figure 3B:
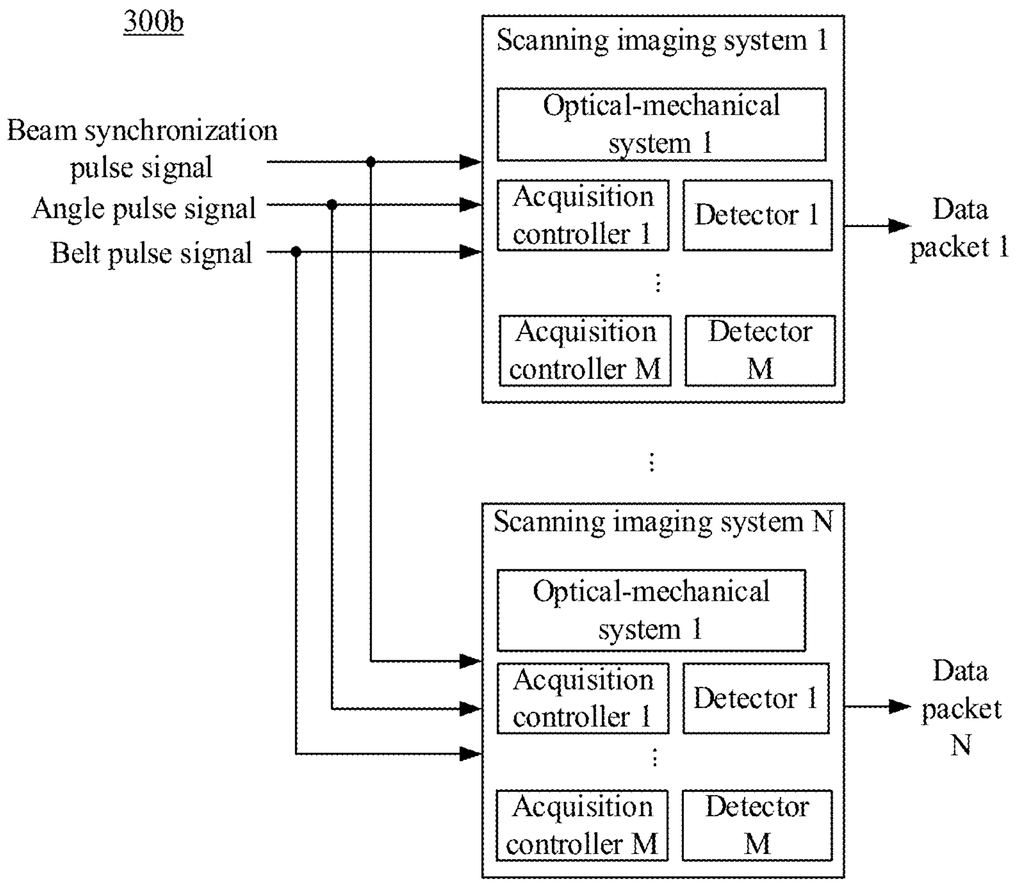
FIG. 3B shows a schematic structural diagram of a static CT scanning device according to another embodiment of the present disclosure.

FIG. 3A shows a schematic structural diagram of a static CT scanning device according to another embodiment of the present disclosure. FIG. 3B shows a schematic structural diagram of a static CT scanning device according to another embodiment of the present disclosure.

The static CT scanning device **300*a* shown in FIG. 3A is similar to the static CT scanning device 100*a* shown in FIG. 1A. The static CT scanning device 300*b* shown in FIG. 3B is similar to the static CT scanning device 100*b* shown in FIG. 1**B.

As shown in FIG. 3A, the static CT scanning device **300*a*** includes N scanning imaging systems, where N is an integer greater than 1. For example, N scanning imaging systems include a scanning imaging system 1, . . . , a scanning imaging system N.

In embodiments of the present disclosure, each scanning imaging system may include an optical-mechanical system, a detector, and an acquisition controller. For example, the scanning imaging system 1 includes an optical-mechanical system 1, a detector 1, and an acquisition controller 1. The scanning imaging system N includes an optical-mechanical system N, a detector N, and an acquisition controller N.

For example, each of the optical-mechanical system 1 and the optical-mechanical system N includes a multi-target array optical machine. Each of the detector 1 and the detector N includes a detector array. The acquisition controller is used to control the detector to acquire the detection data.

For example, the optical-mechanical system 1 emits the scanning ray. The detector 1 receives the scanning ray transmitted through the object to be scanned, and generates detection data based on the received scanning ray. The acquisition controller 1 performs a time synchronization on the angular pulse signal and the belt pulse signal using a beam synchronization pulse signal in response to receiving the beam synchronization pulse signal, so as to obtain the synchronize angle pulse signal and the synchronize belt pulse signal. The acquisition controller 1 generates the timestamp based on the synchronization angle pulse signal and the synchronization belt pulse signal, where the timestamp includes angle data and belt data. The acquisition controller 1 packages the beam data, the detection data, the angle data, and the belt data of the scanning imaging system to obtain the data packet 1.

Similarly, the optical-mechanical system N emits the scanning ray. The detector N receives the scanning ray transmitted through the object to be scanned, and generates detection data based on the received scanning ray. The acquisition controller N performs a time synchronization on the angular pulse signal and the belt pulse signal using a beam synchronization pulse signal in response to receiving the beam synchronization pulse signal, so as to obtain the synchronize angle pulse signal and the synchronize belt pulse signal. The acquisition controller N generates the timestamp based on the synchronization angle pulse signal and the synchronization belt pulse signal, where the timestamp includes angle data and belt data. The acquisition controller N packages the beam data, the detection data, the angle data, and the belt data of the scanning imaging system to obtain the data packet N.

In embodiments of the present disclosure, the data processing processes of the scanning imaging system 1, . . . , and the scanning imaging system N are similar to the operations S210 to S230 included in the data processing method described above. For the sake of simplicity, similar parts will not be repeated in the present disclosure.

In embodiments of the present disclosure, the angle pulse signal includes a first angle pulse signal and a second angle pulse signal. The first angle pulse signal may be an A-direction angle pulse signal, and the second angle pulse signal may be a Z-direction angle pulse signal. The A-direction angle pulse signal is used to characterize the scanning angle of the scanning imaging system, and the Z-direction angle pulse signal is the reset signal for the scanning angle.

For example, when the first pulse of the Z-direction angle pulse signal is received, the optical-mechanical system 1 of the scanning imaging system 1 starts the first circle of scanning the object to be scanned. When the first pulse of the A-direction angle pulse signal is received, the first target optical machine of the optical-mechanical system 1 of the scanning imaging system 1 emits the scanning ray. For example, in the case where the optical-mechanical system 1 includes 40 target optical machines, when the $40^{th}$ pulse of the A-direction angle pulse signal is received, the $40^{th}$ target optical machine of the optical-mechanical system 1 emits the scanning ray. As a result, the scanning imaging system 1 completes the first circle of scanning the object to be scanned in a preset angle range. For example, the preset angle range may be 1° to 120° as described above.

When the second pulse of the Z-direction angle pulse signal is received, the scanning imaging system 1 may reset the A-direction angle pulse signal. For example, when the scanning imaging system 1 controls the optical-mechanical system 1 to perform the first circle of scanning based on the A-direction angle pulse signal, in a case that the second pulse of the Z-direction angle pulse signal is received, the scanning imaging system 1 controls the optical-mechanical system 1 to perform the second circle of scanning from the first target optical machine based on the A-direction angle pulse signal.

For example, in the normal operation of the scanning imaging system 1, after the $40^{th}$ pulse of the A-direction angle pulse signal is used to control the 40th target optical machine to complete the scanning of the object to be scanned, the scanning imaging system 1 may receive the next pulse of the Z-direction angle pulse signal.

As shown in FIG. 3B, the static CT scanning device 300*b* includes N scanning imaging systems, where N is an integer greater than 1. For example, N scanning imaging systems include a scanning imaging system 1, . . . , a scanning imaging system N. The static CT scanning device 300*b* further includes M detectors and M acquisition controllers, where M is an integer greater than 1. For example, M detectors include a detector 1, . . . , a detector M. M acquisition controllers include an acquisition controller 1, . . . , an acquisition controller M.

In embodiments of the present disclosure, each of N scanning imaging systems includes an independent optical-mechanical system, and the N scanning imaging systems share M detectors and M acquisition controllers. The scanning imaging system 1 includes an optical-mechanical system 1, a detector 1, . . . , a detector M, an acquisition controller 1, . . . , an acquisition controller M. The scanning imaging system N includes an optical-mechanical system N, a detector 1, . . . , a detector M, an acquisition controller 1, . . . , an acquisition controller M.

As the N scanning imaging systems share M detectors and M acquisition controllers, the optical-mechanical systems of the N scanning imaging systems emit beams in sequence. For example, the object to be scanned sequentially passes through the scanning imaging system 1, . . . , the scanning imaging system N, and the optical-mechanical system 1, . . . and the optical-mechanical system N emit beams in sequence.

In addition, as N scanning imaging systems share M detectors, M acquisition controllers may selectively upload the detection data acquired by the detectors according to the coverage range of each of the N scanning imaging systems. For example, the detectors corresponding to the coverage range of the optical-mechanical system 1 include detectors 1 to K, where K is a positive integer and 1≤K≤M. When the optical-mechanical system 1 emits a beam, the acquisition controllers 1 to K control the detectors 1 to K to acquire and output the detection data. The detectors corresponding to the coverage range of the optical-mechanical system N include detectors L to M, where L is a positive integer and 1≤L≤M. When the optical-mechanical system N emits a beam, the acquisition controllers L to M control the detectors L to M to acquire and output the detection data.

It should be noted that the number of detectors and the number of acquisition controllers shown in FIG. 3B are only for illustrative purposes. The number of detectors and the number of acquisition controllers may be the same or different. For example, in a case that the number of detectors is the same as the number of acquisition controllers, each acquisition controller may control one corresponding detector. In a case that the number of detectors is greater than the number of acquisition controllers, each acquisition controller may control a certain number of detectors. The present disclosure does not limit the number of detectors and the number of acquisition controllers. Those skilled in the art may provide corresponding number of acquisition controllers for the M detectors based on the number of detectors and the processing capability of the acquisition controller.

As each scanning imaging system uses the plurality of acquisition controllers, there may be time synchronization issues between the plurality of scanning imaging systems. In this way, the acquisition controller within each scanning imaging system generates the timestamp based on the beam synchronization pulse signal and controls the corresponding detectors to synchronously acquire the detection data, ensuring that the data packets generated by the plurality of scanning imaging systems are synchronized.

In embodiments of the present disclosure, the belt pulse signal includes a first belt pulse signal and a second belt pulse signal. The first belt pulse signal may be an A-direction belt pulse signal, and the second belt pulse signal may be a Z-direction belt pulse signal. The A-direction belt pulse signal and the Z-direction belt pulse signal are related to the rotation of the belt pulley of the conveying belt. The A-direction belt pulse signal is used to characterize the belt displacement information, and the Z-direction belt pulse signal is the reset signal for the belt displacement information. The scanning imaging system may determine the rotation of the belt pulley based on the A-direction belt pulse signal and the Z-direction belt pulse signal, so as to determine the current location of the object to be scanned.

For example, the A-direction belt pulse signal is related to a rotation angle of the belt pulley. When the first pulse of the A-direction belt pulse signal is received, the scanning imaging system 1 determines that the belt pulley has rotated by 3°, so as to determine that the object to be scanned has moved by 10 cm. It should be noted that the numerical correspondence between the rotation angle of the belt pulley and the displacement of the object to be scanned above is described as an example. The numerical correspondence between the rotation angle of the belt pulley and the displacement of the object to be scanned is related to the size of the belt pulley.

For example, the Z-direction belt pulse signal is related to the number of rotations of the belt pulley. When the second pulse of the Z-direction belt pulse signal is received, the scanning imaging system 1 may reset the A-direction belt pulse signal. When the second pulse of the A-direction belt pulse signal is received, the scanning imaging system 1 determines that the belt pulley starts to rotate for the second circle, and determines the rotation angle of the belt pulley for the second circle based on the A-direction belt pulse signal.

It should be noted that the first pulse or the second pulse described above is not fixed as a certain pulse in the pulse signal. For example, when the scanning imaging system is started, the received first pulse of the pulse signal may be defaulted to be the first pulse, and subsequent pulses received in sequence may be determined as the second pulse, the third pulse, . . . . For example, the scanning imaging system may also specify that the first pulse of the pulse signal received at a certain moment is defaulted to be the first pulse, and the subsequent pulses received in sequence may be determined as the second pulse, the third pulse, . . . .

In embodiments of the present disclosure, each of the A-direction angle pulse signal and the Z-direction angle pulse signal may be a differential signal. Each of the A-direction belt pulse signal and the Z-direction belt pulse signal may be a differential signal. The beam synchronization pulse signal may also be a differential signal.

For example, two signals with the same amplitude and opposite phases are transmitted to the scanning imaging system using the differential transmission method. These two signals form a differential signal, which may be used as an A-direction angle pulse signal, a Z-direction angle pulse signal, an A-direction belt pulse signal, a Z-direction belt pulse signal, or a beam synchronization pulse signal.

The differential signal has the advantage of strong anti-interference ability. The common mode noise or the interference signal may be equally applied to both signal lines, so the common mode noise or the interference signal of the differential signal is almost zero. In addition, as the two signals have equal amplitude and opposite phases, some of the electromagnetic fields generated by the two signal lines transmitting the two signals may be cancelled each other out, thereby reducing the electromagnetic interference to the outside world. Using the differential signal to control the operating process of the static CT device may reduce the impact of the differential signal on the operating process of the static CT device and improve the accuracy of the scanning data.

In embodiments of the present disclosure, all angle pulse signals and belt pulse signals are reset based on the beam synchronous pulse signal to obtain synchronization angle pulse signals and synchronization belt pulse signals. For example, the acquisition controller 1 generates the angle data 1 based on the synchronization angle pulse signal, and generates the belt data 1 based on the synchronization belt pulse signal. The detector 1 generates the detection data 1 based on the received rays. The beam data 1, the angle data 1, the belt data 1, and the detection data 1 of the scanning imaging system 1 form the scanning data of the scanning imaging system 1, where the angle data 1 and the belt data 1 serve as timestamps for the detection data 1, and the beam data 1 indicates the scanning imaging system 1 corresponding to the detection data 1. The acquisition controller 1 packages the scanning data to obtain the data packet 1.

According to embodiments of the present disclosure, the time synchronization is performed on the angle pulse signals and the belt pulse signals of the plurality of scanning imaging systems using the beam synchronization pulse signal, so that the plurality of scanning imaging systems are in a synchronized operating state. In addition, based on the synchronized angle pulse signal and the synchronized belt pulse signal received by each scanning imaging system, the angle data and the belt data indicating the same time reference may be generated by the plurality of scanning imaging systems. The plurality of scanning imaging systems package respective generated beam data, angle data, belt data, and detection data, so that the corresponding beam data, angle data, belt data, and detection data form the separate data packet corresponding to the scanning imaging system. In the transmission and processing of scanning data, the scanning data corresponding to the plurality of scanning imaging systems are bound with the timestamp that represents time information.

For each data packet, the angle data and the belt data are used as the timestamp of the data packet, and the detection data and the beam data are identified using timestamps with the same time reference. In this way, the time synchronization between the detection data of the plurality of scanning imaging systems may be characterized based on the timestamp, ensuring that the static CT scanning device may acquire accurate and synchronized scanning data through the plurality of scanning imaging systems. This facilitates the quick and accurate determination of data corresponding to the same section in the plurality of data packets when processing the plurality of data packets based on the timestamp subsequently.

Figure 4:
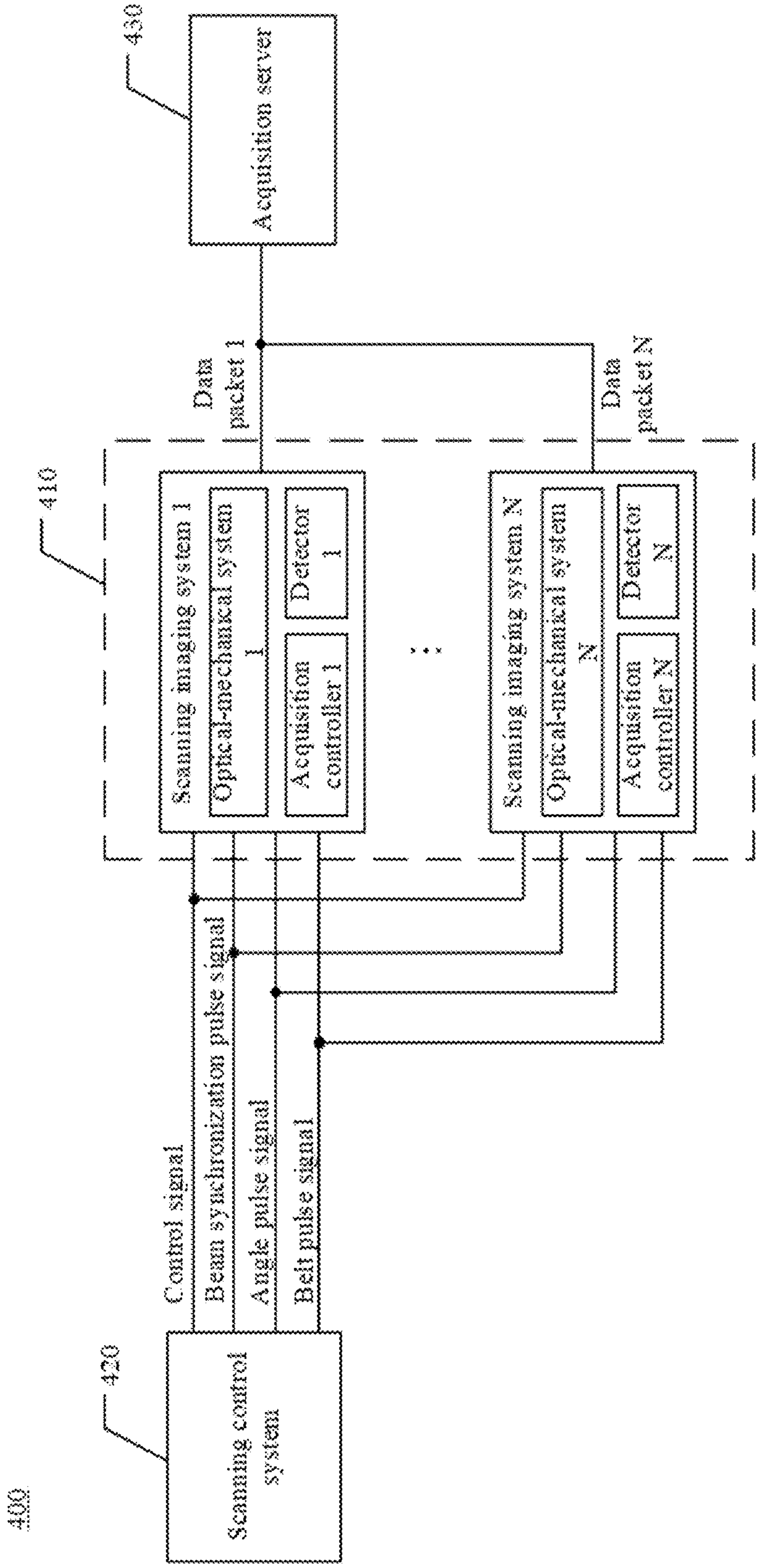
FIG. 4 shows a schematic structural diagram of a static CT scanning device according to another embodiment of the present disclosure.

FIG. 4 shows a schematic structural diagram of a static CT scanning device according to another embodiment of the present disclosure.

As shown in FIG. 4, a static CT scanning device 400 includes N scanning imaging systems 410, a scanning control system 420, and an acquisition server 430.

In embodiments of the present disclosure, N scanning imaging systems 410 are similar to the scanning imaging systems 1, . . . , N shown in FIG. 3A. For the sake of simplicity, it will not be repeated here.

In embodiments of the present disclosure, the scanning control system 420 may send control signals to the N scanning imaging systems 410 through the Controller Area Network (CAN) bus to control the N scanning imaging systems 410 to start and acquire the detection data. The scanning control system 420 may control the N scanning imaging systems 410 to stop acquiring the detection data based on the control signals.

In embodiments of the present disclosure, the N scanning imaging systems 410 may transmit their respective data packets to the acquisition server 430 through their respective transmission interfaces. The acquisition server 430 may rearrange the N data packets to form CT slice data.

In embodiments of the present disclosure, the respective acquisition controllers of N scanning imaging systems 410 may separately count the angle pulse signals and belt pulse signals to generate respective timestamps. When the N scanning imaging systems 410 start collecting the detection data, the scanning control system 420 transmits the beam synchronization pulse signal to the N scanning imaging systems 410. The angle pulse signals and belt pulse signals received by the N scanning imaging systems 410 may be reset at a valid time point of the pulse, so as to obtain N synchronization angle pulse signals and N synchronization belt pulse signals with time synchronization. For example, the valid time point of the pulse may be the moment when the beam synchronization pulse signal is at high level.

After synchronization and reset, the acquisition controller of each of the N scanning imaging systems 410 may separately count the synchronization angle pulse signal and the synchronization belt pulse signal, so as to generate the timestamp.

In embodiments of the present disclosure, if the plurality of scanning imaging systems do not start and enter the operating state at the same time under the control of the control signal, the scanning control system 420 may reset the operating states of the plurality of scanning imaging systems by using the beam synchronization pulse signal, so that the plurality of scanning imaging systems may re-enter the initial operating state at the same time. When the plurality of scanning imaging systems are reset, the detection data generated by the plurality of scanning imaging systems are synchronized in time, and then by using the timestamp to identify the detection data, it is possible to accurately identify from the plurality of data packets the detection data for the same section.

In embodiments of the present disclosure, the acquisition server 430 may parse the N data packets to obtain N beam data, N detection data, N belt data, and N angle data; and perform a data rearrangement on the N detection data based on the N beam data corresponding to the N detection data, the N belt data corresponding to the N detection data, and the N angle data corresponding to the N detection data, so as to obtain N slice data.

For example, the beam data, the detection data, the belt data, and the angle data belonging to the same data packet correspond to each other. The acquisition server 430 determines the acquisition location (the location of the scanning imaging system with respect to the belt) of the detection data based on the beam data corresponding to the detection data, and determines the section of the object to be scanned corresponding to the detection data based on the belt data and the angle data.

In embodiments of the present disclosure, as the plurality of data packets include timestamps with the same time reference, the acquisition server 430 may accurately arrange the detection data belonging to the same section in the plurality of data packets based on the timestamps by using data fusion technology, thereby forming accurate slice data of the object to be scanned.

Figure 5:
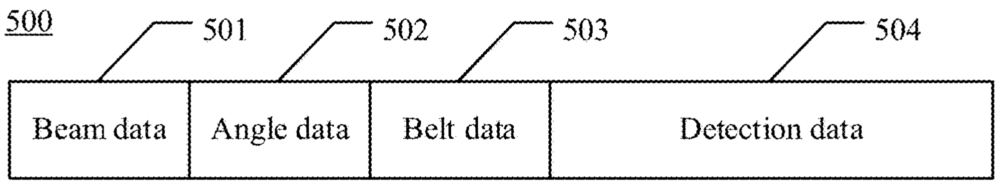
FIG. 5 shows a schematic diagram of a data packet according to an embodiment of the present disclosure.

FIG. 5 shows a schematic structural diagram of a data packet according to an embodiment of the present disclosure.

As shown in FIG. 5, a data packet 500 includes beam data 501, angle data 502, belt data 503, and detection data 504.

In embodiments of the present disclosure, the data packet 500 may be a sequence. For example, the beam data 501, the angle data 502, the belt data 503, and the detection data 504 may be encoded to form a data sequence. The present disclosure does not limit the number of bytes occupied by the data sequence, as well as the number of bytes occupied by each of the beam data 501, the angle data 502, the belt data 503, and the detection data 504. For example, the beam data 501, the angle data 502, and the belt data 503 may occupy 2, 4, and 4 bytes, respectively. The number of bytes occupied by the detection data 504 may vary with the number of scanned sections.

In embodiments of the present disclosure, in the data packet 500, the detection data 504, the angle data 502, and the belt data 503 change in real-time. The detection data 504 corresponds one-to-one with the angle data 502, and the detection data 504 corresponds one-to-one with the belt data 503. For example, when the angle data 502 and the belt data 503 change in real-time, the detection data 504 also changes in real-time. The detection data 504 may include a plurality of detection data, the angle data 502 may include a plurality of angle data, and the belt data 503 may include a plurality of belt data. When generating one angle data and one belt data, one corresponding detection data may also be acquired.

In embodiments of the present disclosure, the angle data 502 includes first angle data and second angle data. For example, the first angle data may be A-direction angle data, which includes the scanning angle of the corresponding scanning imaging system. The second angle data may be Z-direction angle data, which includes the scan count of the scanning imaging system.

In embodiments of the present disclosure, the A-direction angle data is obtained based on the A-direction angle pulse signal, and the Z-direction angle data is obtained based on the Z-direction angle pulse signal. For example, the acquisition controller of the scanning imaging system counts the received pulses of the A-direction angle pulse signal to obtain the A-direction angle data, and counts the received pulses of the Z-direction angle pulse signal to obtain the Z-direction angle data. For example, the A-direction angle data may be 1, 2, 3, . . . . The Z-direction angle data may be 1, 2, 3, . . . . Each Z-direction angle data corresponds to the plurality of A-direction angle data.

For example, the optical-mechanical system of the scanning imaging system includes forty target optical machines, which sequentially emit scanning rays and may complete the scanning of the object to be scanned with a predetermined angle (such as 10 to 120°) within one circle. For example, the A-direction angle data may be 1, 2, 3, . . . , 40, and the Z-direction angle data may be 1, 2, 3, . . . , with each Z-direction angle data corresponding to 40 A-direction angle data. The A-direction angle data "1, 2, 3, . . . , 40" may respectively represent 3°, 6°, 9°, . . . , 120°, and the Z-direction angle data "1, 2, 3, . . . " may respectively represent the scanning of the first circle, the scanning of the second circle, the scanning of the third circle, . . . .

For example, the acquisition detector of the scanning imaging system generates the A-direction angle data as "1, 2, 3, . . . " based on the A-direction angle pulse signal. When receiving the Z-direction angle pulse signal, the acquisition detector resets the A-direction angle data and re-starts generating the A-direction angle data as "1, 2, 3, . . . ".

In embodiments of the present disclosure, the belt data 503 includes first belt data and second belt data. For example, the first belt data may be A-direction belt data, which includes the pulse count value of the synchronization belt pulse signal. The second belt data may be Z-direction belt data, which includes the reset information of the first belt data.

In embodiments of the present disclosure, the A-direction belt data is obtained based on the A-direction belt pulse signal, and the Z-direction belt data is obtained based on the Z-direction belt pulse signal. For example, the acquisition controller of the optical-mechanical system counts the received pulses of the A-direction belt pulse signal to obtain the A-direction belt data, and counts the received pulses of the Z-direction belt pulse signal to obtain the Z-direction belt data. For example, the A-direction belt data may be 1, 2, 3, . . . . The Z-direction belt data may be 1, 2, 3, . . . . Each Z-direction belt data corresponds to the plurality of A-direction belt data.

For example, the belt pulley of the conveying belt rotates 3° each time based on the pulse of the A-direction belt pulse signal, and rotates a full circle (360°) based on 120 A-direction belt pulse signals. For example, the A-direction belt data may be 1, 2, 3, . . . , 120, and the Z-direction belt data may be 1, 2, 3, . . . , with each Z-direction belt data corresponding to 120 A-direction belt data. The A-direction belt data "1, 2, 3, . . . , 120" may respectively represent 3°, 6°, 9°, . . . , 360°, and the Z-direction belt data "1, 2, 3, . . . " may respectively represent the belt pulley rotating of the first circle, the belt pulley rotating of the second circle, the belt pulley rotating of the third circle . . . .

For example, the acquisition detector of the scanning imaging system generates the A-direction belt data as "1, 2, 3, . . . " based on the A-direction belt pulse signal. When receiving the Z-direction belt pulse signal, the acquisition detector resets the A-direction belt data and re-starts generating the A-direction belt data as "1, 2, 3, . . . ".

In embodiments of the present disclosure, the beam data 501 corresponds one-to-one with the scanning imaging systems, the angle data 502, the belt data 503, and the detection data 504. Therefore, the acquisition detector may encode the angle data 502, the belt data 503, and the detection data 504 based on the beam data 501 to obtain the data sequence of each scanning imaging system.

In embodiments of the present disclosure, the angle data 502 and the belt data 503 may be used as unique identifiers for corresponding detection data, thereby providing the detection data a time attribute and improving the accuracy of the detection data. The number of scanning circles of the scanning imaging system and the scanning angle of each circle may be identified by using the Z-direction angle data and the A-direction angle data, respectively. When a large amount of detection data is generated due to too many scanning circles, the Z-direction angle data and the A-direction angle data may also be used to accurately identify the section information and the scanning information corresponding to each detection data, thereby characterizing the time attribute of the detection data. The number of rotations and the rotation angles of the belt pulley may be identified by using the Z-direction belt data and the A-direction belt data, respectively, when there are a large number of objects to be scanned placed on the conveying belt, the Z-direction belt data and the A-direction belt data may also be used to accurately identify the location information of the object to be scanned corresponding to each detection data, thereby characterizing the time attribute of the detection data.

Figure 6:
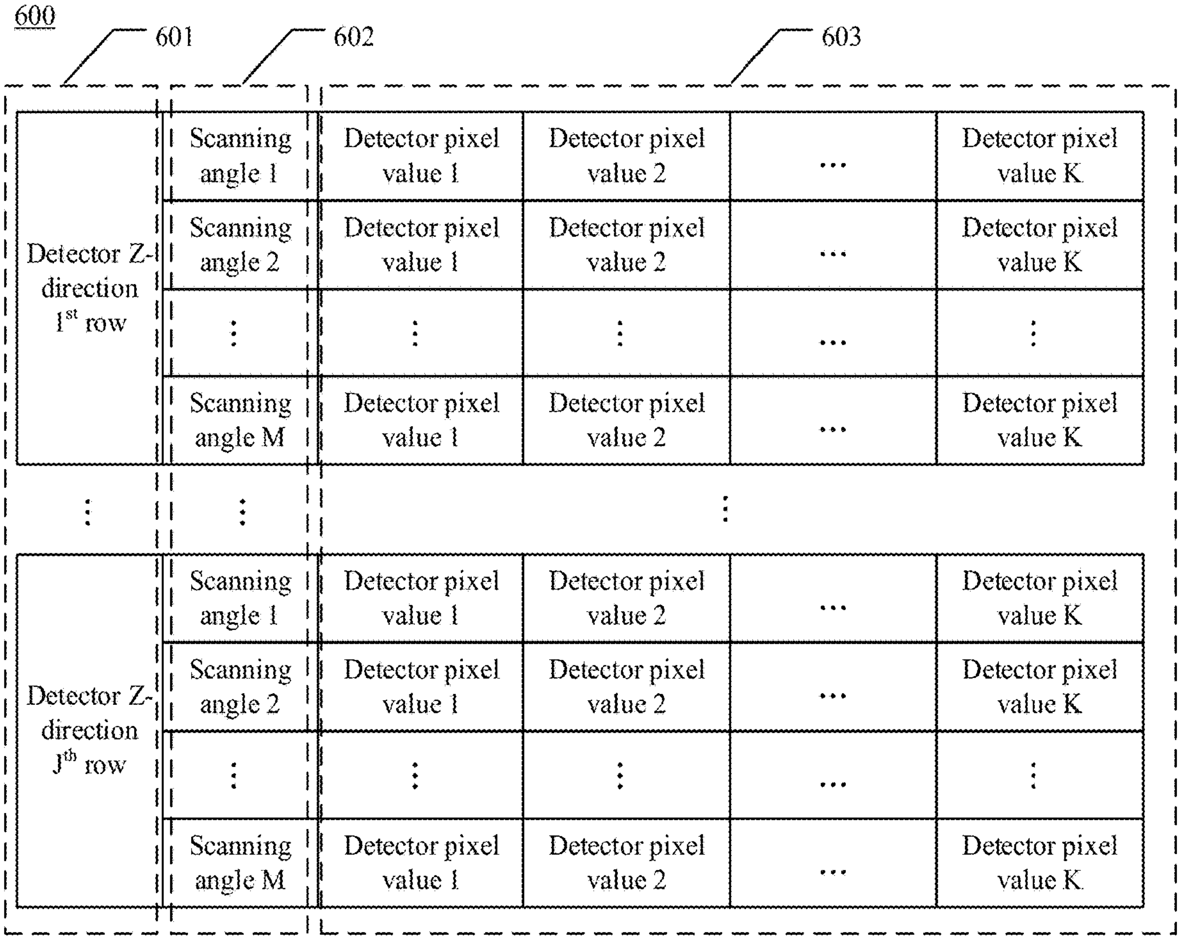
FIG. 6 shows a schematic diagram of slice data according to an embodiment of the present disclosure.

FIG. 6 shows a schematic diagram of slice data according to an embodiment of the present disclosure.

As shown in FIG. 6, slice data 600 includes detector information 601, angle data 602, and detector data 603.

In embodiments of the present disclosure, the detector information 601 includes a plurality of detector numbers. For example, the detector information includes the number of each detector in the scanning imaging system. For example, in each scanning imaging system, the detectors are arranged in the detector array, and the detector number is set based on the number of detector rows. For example, the detector numbers include a detector Z-direction $1^{st}$ row, . . . , a detector Z-direction $J^{th}$ row, where J is a positive integer.

In embodiments of the present disclosure, the angle data 602 includes M scanning angles, where M is an integer greater than 1. For example, the angle data 602 may include a scanning angle 1, . . . , a scanning angle M. For example, the angle data 602 may be determined based on the angle data 502 shown in FIG. 5.

In embodiments of the present disclosure, the detector data 603 includes M×K detector pixel values, where K is an integer greater than 1. For example, the detector pixel values may be grayscale values. The detector data 603 includes the data detected by K detectors corresponding to each of M scanning angles.

In embodiments of the present disclosure, the slice data 600 illustrates a data structure of one slice data. The slice data 600 indicates M×K detector pixel values detected by the detectors corresponding to each of the plurality of detector numbers at the M scanning angles. For example, the slice data 600 indicates data scanned by the plurality of scanning imaging systems.

For example, the detector Z-direction $1^{st}$ row may indicate the first row of detectors arranged in the Z direction in the plurality of scanning imaging systems (all scanning imaging systems in the static CT scanning device). For example, the Z direction may be the conveying direction of the conveying belt. Correspondingly, the angle data 602 may indicate the scanning angles of the optical-mechanical systems of the plurality of scanning imaging systems. For example, M may be 120, and scanning angles 1, 2, 3, . . . , and 120 may represent 3°, 6°, 9°, . . . , and 360°, respectively. The detector data 603 may indicate the 120×K detector pixel values detected by K detectors in each row in the plurality of scanning imaging systems at 120 scanning angles.

In embodiments of the present disclosure, the angle data 602 may be determined based on the A-direction angle data. The slice data 600 may correspond to the Z-direction angle data. For example, the acquisition server shown in FIG. 4 acquires the A-direction angle data and detection data corresponding to the same Z-direction angle data in N data packets, and rearranges the A-direction angle data and detection data corresponding to the same Z-direction angle data, so as to obtain the slice data 600 shown in FIG. 6.

For example, the acquisition server acquires the A-direction angle data "3°, 6°, . . . , 120°", "123°, 126°, . . . , 240°" and "243°, 246°, . . . , 360°" corresponding to the Z-direction angle data "1" in the N data packets, so as to obtain 120 A-direction angle data, and acquire J×K detection data corresponding to each A-direction angle data. According to the detector number, the J×K detection data corresponding to each A-direction angle data is arranged, so as to obtain the M×K detector pixel values detected by each row of detectors in the J rows of detectors corresponding to the J detector numbers at M scanning angles.

In embodiments of the present disclosure, based on the same Z-direction angle data in the plurality of data packets, all detection data corresponding to the same section may be acquired. As the plurality of data packets have the same time reference, rearranging the detection data corresponding to the same Z-direction angle data in the plurality of data packets may accurately generate the slice data for the section corresponding to the Z-direction angle data. The slice data is two-dimensional data that may represent the image information of the corresponding section. Based on the plurality of slice data 600, three-dimensional reconstruction of the object to be scanned may be achieved, resulting in a three-dimensional image. In the static CT scanning device, data fusion is performed on the plurality of data packets based on timestamps in the data packets of the plurality of scanning imaging systems, which may improve the accuracy of slice data and thus enhance the reliability of 3D reconstructed images.

It should be noted that in the above description, the technical solution of embodiments of the present disclosure is only shown by way of example, but it does not mean that embodiments of the present disclosure are limited to the above steps and structures. Where possible, adjustments and trade-offs may be made to the steps and structures as needed. Therefore, certain steps and units are not essential elements for implementing the overall inventive concept of embodiments of the present disclosure.

So far, the present disclosure has been described in conjunction with the preferred embodiments. It should be understood that those skilled in the art may make various other changes, substitutions, and additions without departing from the spirit and scope of embodiments of the present disclosure. Therefore, the scope of embodiments of the present disclosure is not limited to the specific embodiments described above, but should be defined by the appended claims.

What is claimed is:

1. A data processing method for static computed tomography scanning, comprising:

performing, in response to receiving a beam synchronization pulse signal, a time synchronization on N angle pulse signals and a time synchronization on N belt pulse signals by using the beam synchronization pulse signal, so as to obtain N synchronization angle pulse signals and N synchronization belt pulse signals, respectively, where N is an integer greater than 1;

generating N timestamps based on the N synchronization angle pulse signals and the N synchronization belt pulse signals, wherein the N timestamps correspond to N scanning imaging systems of a static computed tomography scanning device, respectively, and each of the N timestamps comprises angle data and belt data; and packaging beam data, detection data, the angle data, and the belt data corresponding to each of the N scanning imaging systems to obtain N data packets.

2. The method according to claim 1, wherein each of the N data packets comprises the beam data, the angle data, the belt data, and the detection data.

3. The method according to claim 1, wherein the angle data comprises first angle data and second angle data, the first angle data comprises a scanning angle of a corresponding scanning imaging system, and the second angle data comprises a scanning count of the scanning imaging system.

4. The method according to claim 2, wherein the angle data comprises first angle data and second angle data, the first angle data comprises a scanning angle of a corresponding scanning imaging system, and the second angle data comprises a scanning count of the scanning imaging system.

5. The method according to claim 1, wherein the belt data comprises first belt data and second belt data, the first belt data comprises a pulse count value of the synchronization belt pulse signal, and the second belt data comprises a reset information of the first belt data.

6. The method according to claim 2, wherein the belt data comprises first belt data and second belt data, the first belt data comprises a pulse count value of the synchronization belt pulse signal, and the second belt data comprises a reset information of the first belt data.

7. The method according to claim 1, further comprising:

parsing the N data packets to obtain N beam data, N detection data, N belt data, and N angle data; and performing a data rearrangement on the N detection data based on the N beam data corresponding to the N detection data, the N belt data corresponding to the N detection data, and the N angle data corresponding to the N detection data, so as to obtain N slice data.

8. The method according to claim 7, wherein each of the N slice data comprises a detector information, the angle data, and detector data, the detector information comprises a plurality of detector numbers, the angle data comprises M scanning angles, the detector data comprises M×K detector pixel values, and each of M and K is an integer greater than 1; and wherein each of the N slice data indicates the M×K detector pixel values detected by detectors corresponding to each of the plurality of detector numbers at the M scanning angles.

9. The method according to claim 1, wherein the beam synchronization pulse signal is a differential signal;

wherein the angle pulse signal comprises a first angle pulse signal and a second angle pulse signal, each of the first angle pulse signal and the second angle pulse signal is a differential signal, the first angle pulse signal indicates a scanning angle of the scanning imaging system, and the second angle pulse signal is a reset signal for the scanning angle; and wherein the belt pulse signal comprises a first belt pulse signal and a second belt pulse signal, each of the first belt pulse signal and the second belt pulse signal is a differential signal, the first belt pulse signal indicates a belt displacement information, and the second belt pulse signal is a reset signal for the belt displacement information.

10. The method according to claim 2, wherein the beam synchronization pulse signal is a differential signal;

wherein the angle pulse signal comprises a first angle pulse signal and a second angle pulse signal, each of the first angle pulse signal and the second angle pulse signal is a differential signal, the first angle pulse signal indicates a scanning angle of the scanning imaging system, and the second angle pulse signal is a reset signal for the scanning angle; and wherein the belt pulse signal comprises a first belt pulse signal and a second belt pulse signal, each of the first belt pulse signal and the second belt pulse signal is a differential signal, the first belt pulse signal indicates a belt displacement information, and the second belt pulse signal is a reset signal for the belt displacement information.

11. The method according to claim 3, wherein the beam synchronization pulse signal is a differential signal;

wherein the angle pulse signal comprises a first angle pulse signal and a second angle pulse signal, each of the first angle pulse signal and the second angle pulse signal is a differential signal, the first angle pulse signal indicates a scanning angle of the scanning imaging system, and the second angle pulse signal is a reset signal for the scanning angle; and wherein the belt pulse signal comprises a first belt pulse signal and a second belt pulse signal, each of the first belt pulse signal and the second belt pulse signal is a differential signal, the first belt pulse signal indicates a belt displacement information, and the second belt pulse signal is a reset signal for the belt displacement information.

12. The method according to claim 4, wherein the beam synchronization pulse signal is a differential signal;

wherein the angle pulse signal comprises a first angle pulse signal and a second angle pulse signal, each of the first angle pulse signal and the second angle pulse signal is a differential signal, the first angle pulse signal indicates a scanning angle of the scanning imaging system, and the second angle pulse signal is a reset signal for the scanning angle; and wherein the belt pulse signal comprises a first belt pulse signal and a second belt pulse signal, each of the first belt pulse signal and the second belt pulse signal is a differential signal, the first belt pulse signal indicates a belt displacement information, and the second belt pulse signal is a reset signal for the belt displacement information.

13. The method according to claim 5, wherein the beam synchronization pulse signal is a differential signal;

wherein the angle pulse signal comprises a first angle pulse signal and a second angle pulse signal, each of the first angle pulse signal and the second angle pulse signal is a differential signal, the first angle pulse signal indicates a scanning angle of the scanning imaging system, and the second angle pulse signal is a reset signal for the scanning angle; and wherein the belt pulse signal comprises a first belt pulse signal and a second belt pulse signal, each of the first belt pulse signal and the second belt pulse signal is a differential signal, the first belt pulse signal indicates a belt displacement information, and the second belt pulse signal is a reset signal for the belt displacement information.

14. The method according to claim 6, wherein the beam synchronization pulse signal is a differential signal;

wherein the angle pulse signal comprises a first angle pulse signal and a second angle pulse signal, each of the first angle pulse signal and the second angle pulse signal is a differential signal, the first angle pulse signal indicates a scanning angle of the scanning imaging system, and the second angle pulse signal is a reset signal for the scanning angle; and wherein the belt pulse signal comprises a first belt pulse signal and a second belt pulse signal, each of the first belt pulse signal and the second belt pulse signal is a differential signal, the first belt pulse signal indicates a belt displacement information, and the second belt pulse signal is a reset signal for the belt displacement information.

15. A static computed tomography scanning device, comprising:

N scanning imaging systems, wherein N is an integer greater than 1;

wherein each of the N scanning imaging systems comprises:

an optical-mechanical system configured to emit a scanning ray;

a detector configured to receive the scanning ray transmitted through an object to be scanned and generate detection data based on the received scanning ray; and an acquisition controller configured to: perform, in response to receiving a beam synchronization pulse signal, a time synchronization on angle pulse signals and a time synchronization on belt pulse signals by using the beam synchronization pulse signal, so as to obtain synchronization angle pulse signals and synchronization belt pulse signals, respectively; generate timestamps based on the synchronization angle pulse signals and the synchronization belt pulse signals, wherein each of the timestamps comprises angle data and belt data; and package beam data, detection data, the angle data, and the belt data of the corresponding scanning imaging system to obtain a data packet.

* * * * *